United States Patent
Mochizuki (10) Patent No.: US 8,922,814 B2
(45) Date of Patent: Dec. 30, 2014

(54) INFORMATION PROCESSING APPARATUS AND METHOD, PRINT SYSTEM, AND COMPUTER READABLE MEDIUM

(75) Inventor: Akiko Mochizuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 89 days.

(21) Appl. No.: 13/396,251

(22) Filed: Feb. 14, 2012

(65) Prior Publication Data

US 2013/0010326 A1   Jan. 10, 2013

(30) Foreign Application Priority Data

Jul. 5, 2011   (JP) .................................. 2011-149446

(51) Int. Cl.
  *G06F 3/12*   (2006.01)
  *G06F 1/32*   (2006.01)

(52) U.S. Cl.
  CPC ............ *G06F 3/1221* (2013.01); *G06F 1/3209* (2013.01); *G06F 1/3284* (2013.01); *G06F 3/1229* (2013.01); *G06F 3/1288* (2013.01); *Y02B 60/1267* (2013.01); *Y02B 60/1271* (2013.01)
  USPC ........................................ 358/1.15; 358/1.14

(58) Field of Classification Search
  CPC ... G06F 1/3209; G06F 1/3284; G06F 3/1221; G06F 3/1229; G06F 3/1288
  USPC ................... 358/1.1–1.9, 1.11–1.18
  See application file for complete search history.

(56) References Cited

U.S. PATENT DOCUMENTS

| | | | | |
|---|---|---|---|---|
| 6,379,058 | B1 * | 4/2002 | Petteruti et al. | 400/76 |
| 2004/0169728 | A1 * | 9/2004 | Kuwano et al. | 348/207.2 |
| 2004/0185882 | A1 * | 9/2004 | Gecht et al. | 455/466 |
| 2006/0265473 | A1 | 11/2006 | Muto | |
| 2007/0011362 | A1 * | 1/2007 | Umekage et al. | 710/15 |
| 2010/0268801 | A1 * | 10/2010 | Yukimasa | 709/220 |

FOREIGN PATENT DOCUMENTS

| | | |
|---|---|---|
| JP | 2001-022550 A | 1/2001 |
| JP | 2002-113925 A | 4/2002 |
| JP | 2004-334793 A | 11/2004 |
| JP | 2010-176424 A | 8/2010 |

* cited by examiner

*Primary Examiner* — King Poon
*Assistant Examiner* — Ibrahim Siddo
(74) *Attorney, Agent, or Firm* — Sughrue Mion, PLLC (57) ABSTRACT

An information processing apparatus includes a determining unit and a processor. The determining unit determines, upon detecting that a specific printing device is not checking whether print instruction information indicating an instruction to print a document in the specific printing device is retained in a service which generates print instruction information indicating an instruction to print a document in a specified printing device, that the specific printing device is not in a checking state in which it is intermittently checked whether print instruction information is retained in the service. The processor performs processing for allowing the specific printing device to shift to the checking state if the determining unit has determined that the specific printing device is not in the checking state.

13 Claims, 11 Drawing Sheets

INFORMATION PROCESSING APPARATUS AND METHOD, PRINT SYSTEM, AND COMPUTER READABLE MEDIUM

CROSS-REFERENCE TO RELATED APPLICATIONS

This application is based on and claims priority under 35 USC 119 from Japanese Patent Application No. 2011-149446 filed Jul. 5, 2011.

BACKGROUND

(i) TECHNICAL FIELD

The present invention relates to an information processing apparatus and method, a print system, and a computer readable medium.

SUMMARY

According to an aspect of the invention, there is provided an information processing apparatus including: a determining unit that determines, upon detecting that a specific printing device is not checking whether print instruction information indicating an instruction to print a document in the specific printing device is retained in a service which generates print instruction information indicating an instruction to print a document in a specified printing device, that the specific printing device is not in a checking state in which it is intermittently checked whether print instruction information is retained in the service; and a processor that performs processing for allowing the specific printing device to shift to the checking state if the determining unit has determined that the specific printing device is not in the checking state.

BRIEF DESCRIPTION OF THE DRAWINGS

Exemplary embodiment(s) of the present invention will be described in detail based on the following figures, wherein.

DETAILED DESCRIPTION

Exemplary embodiments of the invention will be described below in detail with reference to the accompanying drawings.

Figure 1:
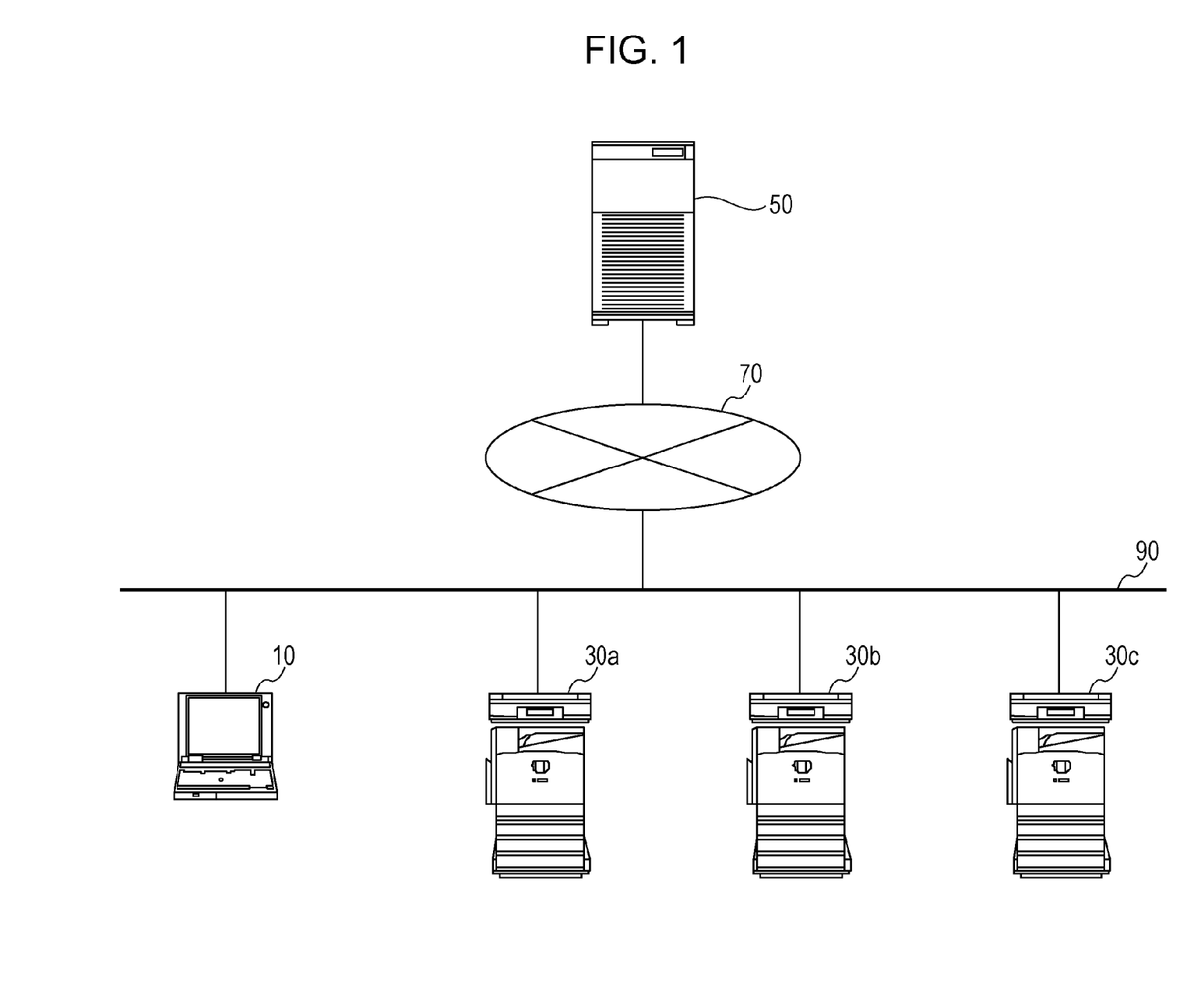
FIG. 1 illustrates an example of the overall configuration of a cloud print system to which an exemplary embodiment of the invention is applied.

FIG. 1 illustrates an example of the overall configuration of a cloud print system to which exemplary embodiments are applied.

In this cloud print system, as shown in FIG. 1, a terminal apparatus 10 and image forming apparatuses 30a, 30b, and 30c are connected to a network 90. The network 90 is connected to a network 70 via a gateway server (not shown), and a cloud print server 50 is connected to the network 70.

In FIG. 1, the image forming apparatuses 30a, 30b, and 30c are individually shown. However, they are simply referred to as the "image forming apparatus 30" or "image forming apparatuses 30" if it is not necessary to distinguish them from one another. Although only three image forming apparatuses 30 are shown in FIG. 1, four or more image forming apparatuses 30 may be provided.

The terminal apparatus 10 is a computer device that requests the cloud print server 50 to print documents. As the terminal apparatus 10, a personal computer (PC), a personal digital assistant (PDA), a cellular telephone, etc. may be used. In an exemplary embodiment, the terminal apparatus 10 is provided as an example of a requesting device.

The image forming apparatus 30 is an apparatus that forms an image on a recording medium and outputs the recording medium as a print medium. The image forming apparatus 30 may be an apparatus having only a printer function or a multifunction apparatus including plural image processing functions, such as a printer function, a scanner function, a facsimile function, etc.

The cloud print server 50 is a server computer that uses various devices as the terminal apparatus 10 and provides services for allowing the image forming apparatuses 30 installed in homes, offices, public facilities, etc. to print documents (such services are referred to as a "cloud print service"). More specifically, in response to a request from the terminal apparatus 10 to generate print instruction information for instructing an image forming apparatus 30 to print a document, the cloud print server 50 generates print instruction information and stores it until a query about the presence of the print instruction information is made from that image forming apparatus 30. Upon receiving such a query, the cloud print server 50 generates a document image in a format that can be processed for all the image forming apparatuses 30, and provides the generated document image to the image forming apparatus 30 that has made the query. In the exemplary embodiments, as an example of services for generating print instruction information, a cloud print service is utilized.

The network 70 serves as a communication medium used for performing communication between the terminal apparatus 10 and the cloud print server 50 or between the image forming apparatuses 30 and the cloud print server 50. The network 70 is, for example, the Internet.

The network 90 serves as a communication medium used for performing communication between the terminal apparatus 10 and the image forming apparatuses 30. The network 90 is, for example, a local area network (LAN).

An example of the hardware configuration of the terminal apparatus 10 will now be discussed with reference to FIG. 2.

Figure 2:
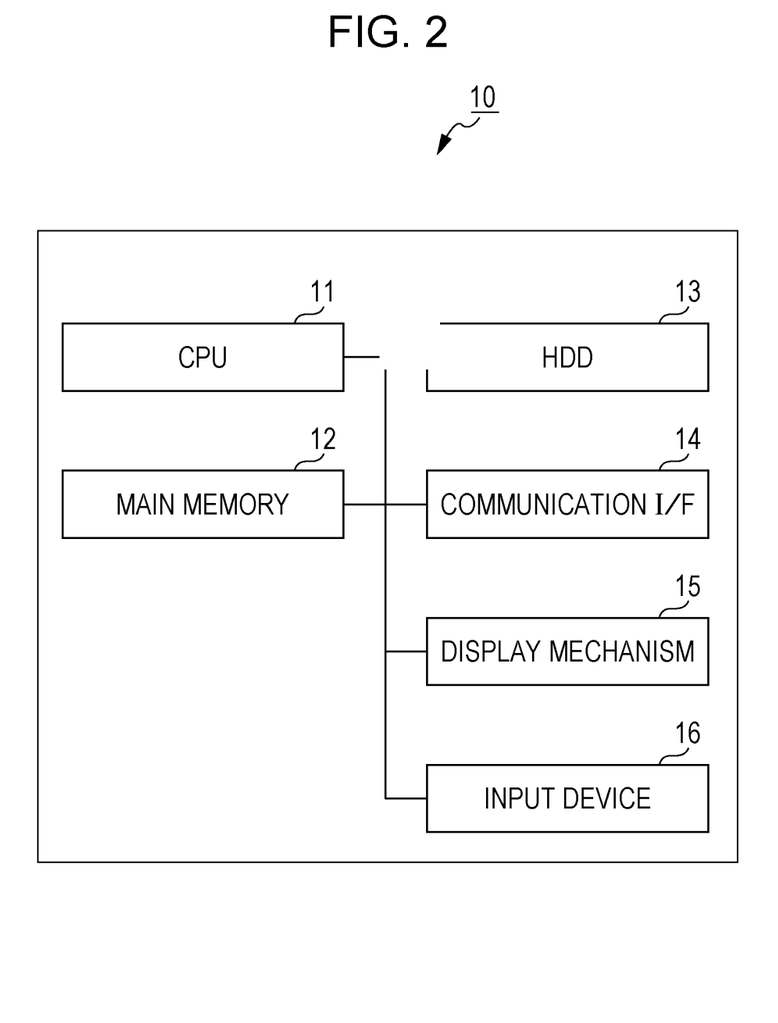
FIG. 2 illustrates an example of the hardware configuration of a terminal apparatus according to an exemplary embodiment of the invention.

The terminal apparatus 10 includes, as shown in FIG. 2, a central processing unit (CPU) 11, which serves as an arithmetic unit, a main memory 12, which serves as a storage unit, and a hard disk drive (HDD) 13, which also serves as a storage unit. The CPU 11 executes an operating system (OS) and various software applications so as to implement functions, which will be discussed later. The main memory 12 is a storage area for storing therein various software applications and data used for the execution of such software applications. The HDD 13 is a storage area for storing therein input data to be input into various software applications and output data to be output from various software applications.

The terminal apparatus 10 also includes a communication interface (hereinafter referred to as the "communication I/F") 14 for performing communication with external devices, a display mechanism 15 including a video memory, a display, etc., and an input device 16, such as a keyboard, a mouse, etc.

The hardware configuration shown in FIG. 2 may also be a hardware configuration of the cloud print server 50. In this case, the hardware configuration of the cloud print server 50 includes a CPU 51, a main memory 52, an HDD 53, a communication I/F 54, a display mechanism 55, and an input device 56, instead of the CPU 11, the main memory 12, the HDD 13, the communication I/F 14, the display mechanism 15, and the input device 16, respectively.

Figure 3:
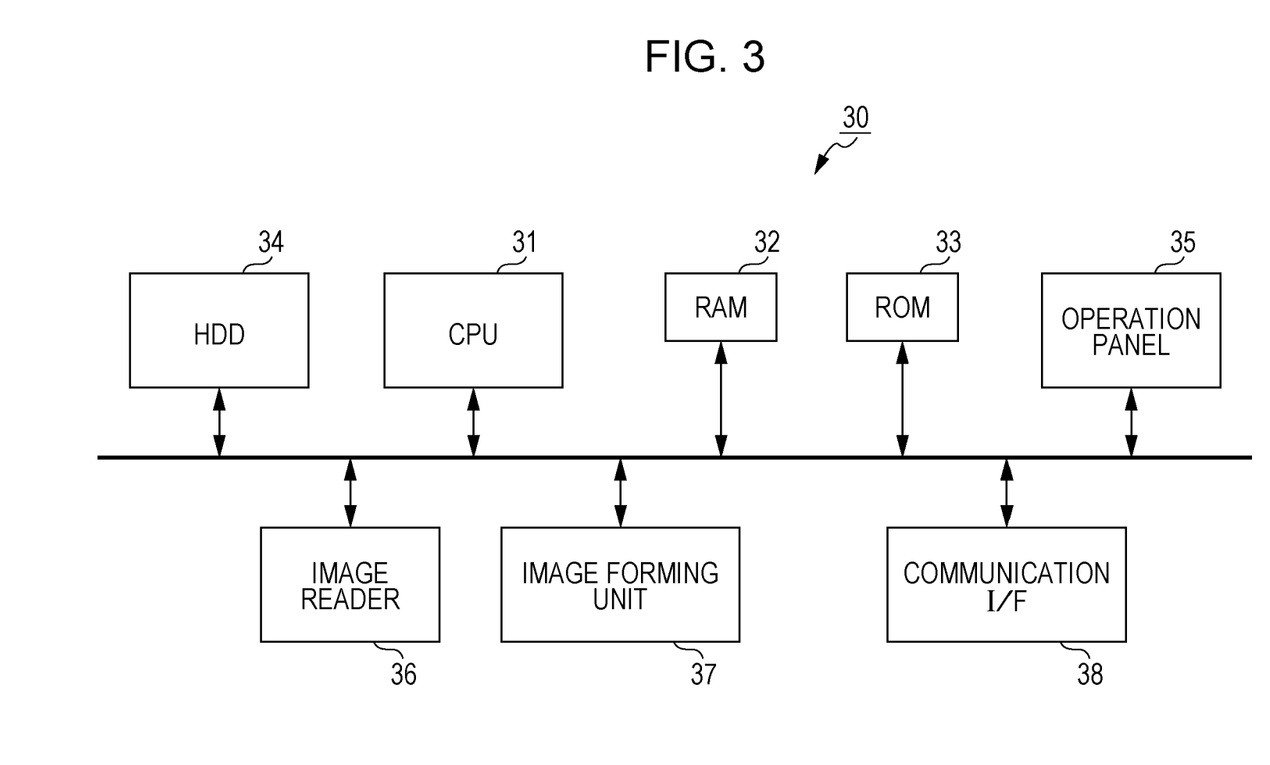
FIG. 3 illustrates an example of the hardware configuration of an image forming apparatus according to an exemplary embodiment of the invention.

FIG. 3 illustrates an example of the hardware configuration of the image forming apparatus 30.

The image forming apparatus 30 includes, a CPU 31, a random access memory (RAM) 32, a read only memory (ROM) 33, an HDD 34, an operation panel 35, an image reader 36, an image forming unit 37, and a communication interface (hereinafter referred to as the "communication I/F") 38.

The CPU 31 loads various programs stored in the ROM 33 into the RAM 32 so as to implement various functions, which will be discussed later.

The RAM 32 is a memory used as a work memory, etc. for the CPU 31.

The ROM 33 is a memory for storing therein various programs, etc. executed by the CPU 31.

The HDD 34 is, for example, a magnetic disk device, and stores therein image data read by the image reader 36 and image data, etc., used for performing image formation by the image forming unit 37.

The operation panel 35 is, for example, a touch panel, and displays various items of information and receives information input through an operation from a user.

The image reader 36 reads images recorded on a recording medium, such as paper. The image reader 36 is, for example, a scanner, and a charge coupled device (CCD) scanner or a contact image sensor (CIS) scanner may be used as the image reader 36. In the CCD scanner, light is applied from a light source to a document, and light reflected by the document is condensed through a lens and is received by CCDs. In the CIS scanner, light beams are sequentially applied from a light source including light emitting diodes (LEDs) to a document, and light beams reflected by the document are received by a CIS.

The image forming unit 37 forms an image on a recording medium. The image forming unit 37 is, for example, a printer, and an electrophotographic printer or an ink-jet printer may be used. In the electrophotographic printer, images are formed by transferring toner attached to a photoconductor onto a recording medium. In the ink-jet printer, images are formed by ejecting ink onto a recording medium. In an exemplary embodiment, the image forming unit 37 is provided as an example of a printer.

The communication I/F 38 sends and receives various items of information to and from other devices via a network.

Generally, from a power saving viewpoint, the image forming apparatus 30 is provided with two operation modes, i.e., a normal mode, which is an example of normal states, and a power-saving mode, which is an example of power-saving states. The normal mode includes an operation mode in which an operation is performed by using the image reader 36 and the image forming unit 37 and a standby mode which can be shifted to the operation mode if there is a request. The power-saving mode is a mode in which, if a request has not been received for a predetermined period during the normal mode, power supply to the image forming apparatus 30 stops, except for a portion for detecting a request received by the image forming apparatus 30. That is, less power is consumed in the power-saving mode than in the normal mode. The power-saving mode is also called a sleep mode, and includes a state in which power is OFF.

However, under the above-described circumstances, the following situation may be encountered in a system, such as in the cloud print system shown in FIG. 1. In the cloud print system shown in FIG. 1, the cloud print server 50 generates print data, and an image forming apparatus 30 detects that print data has been generated in the cloud print server 50 and obtains the print data. In this case, if the image forming apparatus 30 shifts to the power-saving mode, the image forming apparatus 30 may not be able to detect that print data has been generated in the cloud print server 50. Then, even if a user tries to obtain a printed material which should have been output from the image forming apparatus 30, processing has not even started. The user then instructs the image forming apparatus 30 to shift to the normal mode, and the image forming apparatus 30 then queries the cloud print server 50 regarding whether print data has been generated. The cloud print server 50 then generates a document image, and the image forming apparatus 30 obtains and prints the document image. In this manner, the user has to wait long before the document image is actually printed.

Such a situation may be avoided by the image forming apparatus 30 frequently querying the cloud print server 50 even after the image forming apparatus 30 has shifted to the power-saving mode. This is not, however, practical since the power-saving performance is considerably decreased.

In an exemplary embodiment, even after the image forming apparatus 30 has shifted to the power-saving mode in which the image forming apparatus 30 does not, at least regularly, access the cloud print server 50, it is possible for a user who has requested the cloud print server 50 to perform printing by using the image forming apparatus 30 to obtain a printed material without waiting.

First Exemplary Embodiment

An operation of a first exemplary embodiment will be briefly described first. In this exemplary embodiment, the term "power-saving mode" refers to a state in which access is not made, at least regularly, to the cloud print server 50.

Figure 4:
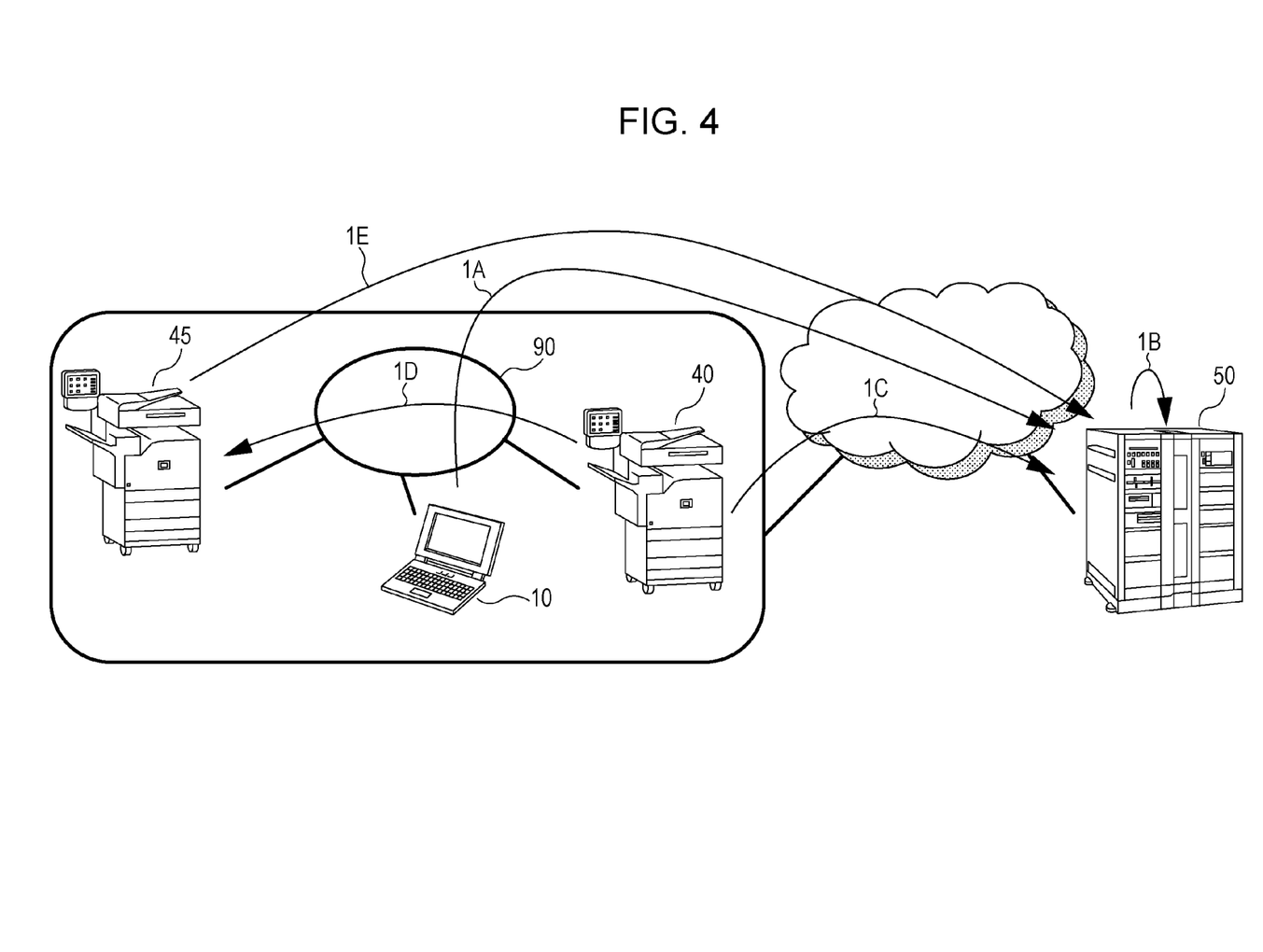
FIG. 4 schematically illustrates an operation according to a first exemplary embodiment of the invention.

FIG. 4 schematically illustrates an operation of the first exemplary embodiment. In the first exemplary embodiment, one of the image forming apparatuses 30a, 30b, and 30c connected to the network 90 is set as the image forming apparatus 30 which does not shift to the power-saving mode because, for example, it is also used as a facsimile machine. Such an image forming apparatus 30 is set as an image forming apparatus 40, which is an example of an information processing apparatus. The other image forming apparatuses 30 are each set as an image forming apparatus 45, which is an example of a printing device.

In response to an operation performed by a user, the terminal apparatus 10 requests the cloud print server 50 to print a document by using the image forming apparatus 45 (indicated by the arrow 1A in FIG. 4).

Then, the cloud print server 50 generates print instruction information for the image forming apparatus 45, and waits for polling from the image forming apparatus 45 (indicated by the arrow 1B in FIG. 4).

The image forming apparatus 40 does not shift to the power-saving mode. Accordingly, the image forming apparatus 40 regularly performs polling for the cloud print server 50, and, at the same time, checks whether print instruction information for any of the image forming apparatuses located within the same network is stored in the cloud print server (indicated by the arrow 1C in FIG. 4).

Upon detecting that print instruction information for the image forming apparatus 45 is stored in the cloud print server 50, the image forming apparatus 40 outputs a packet for changing the image forming apparatus 45 from the power-saving mode to the normal mode (such a packet is referred to as a "mode changing packet") to the image forming apparatus 45 (indicated by the arrow 1D in FIG. 4).

In response to the mode changing packet sent from the image forming apparatus 40, the image forming apparatus 45 shifts from the power-saving mode to the normal mode. The image forming apparatus 45 then performs polling for the cloud print server 50 and obtains and prints a document generated on the basis of the print instruction information (indicated by the arrow 1E in FIG. 4).

The mode changing packet which is output in the operation indicated by the arrow 1D does not have to be a special packet that gives an instruction to perform polling, but may be a packet that accesses a webpage for managing printers (hereinafter such a webpage is simply called a "management page"). In the image forming apparatus 45, a timer, which does not count during the power-saving mode, is set. Accordingly, the image forming apparatus 45, which performs polling at predetermined regular intervals during the normal mode, stops performing polling after shifting to the power-saving mode. However, upon receiving the above-described mode changing packet that accesses the management page, the image forming apparatus 45 restarts performing polling since the timer restarts counting.

As an example of the information processing apparatus, instead of the image forming apparatus 40, a print server connected to the network 90 may be used. Then, the print server may regularly perform polling for the cloud print server 50 to check for print instruction information for the image forming apparatus 45. In the first exemplary embodiment, however, a description will be given, assuming that the image forming apparatus 40 performs such an operation.

Details of the configuration and the operation of the first exemplary embodiment will be given.

The major components of the cloud print system of the first exemplary embodiment are the image forming apparatuses 40 and 45. Accordingly, the configurations of the image forming apparatuses 40 and 45 will be discussed first.

Figure 5:
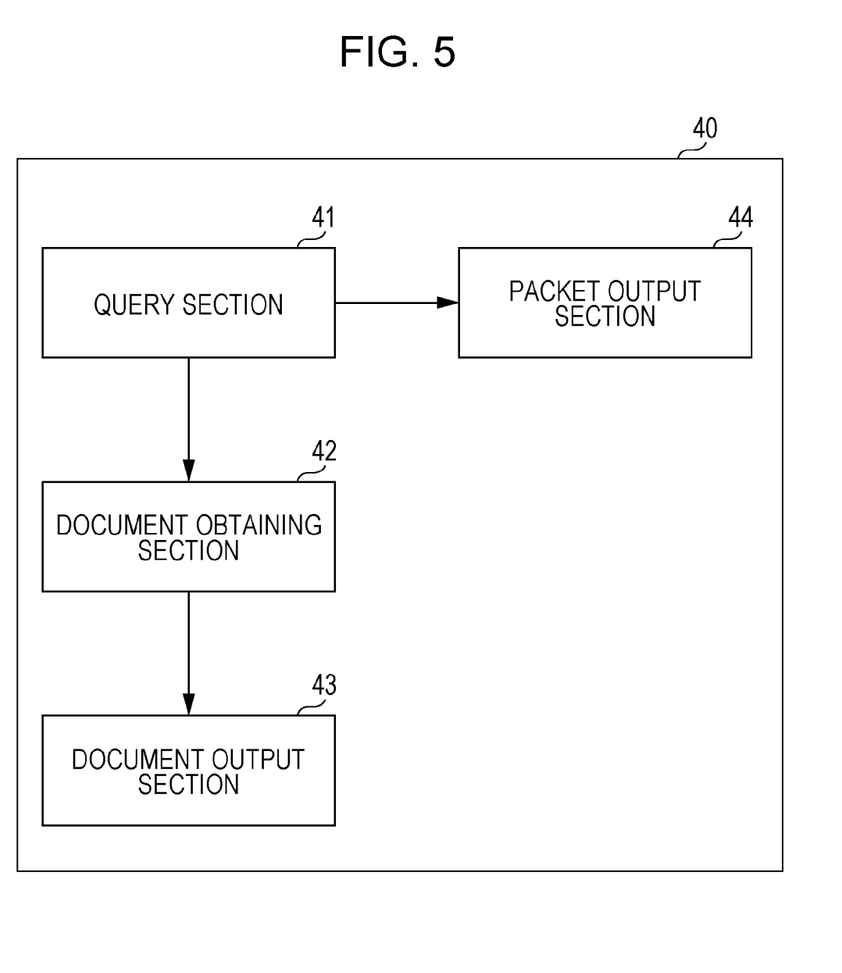
FIG. 5 is a block diagram illustrating an example of a first functional configuration of an image forming apparatus according to the first exemplary embodiment.

FIG. 5 is a block diagram illustrating an example of the functional configuration of the image forming apparatus 40.

The image forming apparatus 40 includes, as shown in FIG. 5, a query section 41, a document obtaining section 42, a document output section 43, and a packet output section 45.

The query section 41 queries the cloud print server 50 regarding the presence of print instruction information via the communication I/F 38. Upon receiving a response to this query via the communication I/F 38, the query section 41 determines, on the basis of this response, whether print instruction information indicating an instruction to print a document in any one of the image forming apparatuses within the network 90 is stored in the cloud print server 50, and also determines, if such print instruction information is stored in the cloud print server 50, whether the print instruction information indicates an instruction to print a document in the image forming apparatus 40. In the first exemplary embodiment, the query section 41 is provided as an example of a checking unit that intermittently checks whether print instruction information is retained in a service, and as an example of a checking unit that checks whether print instruction information is stored in a service.

The document obtaining section 42 obtains, via the communication I/F 38, document in a portable document format (PDF) (hereinafter referred to as a "PDF document") which has been generated on the basis of print instruction information. If the print instruction information indicates an instruction to print a document in a format other than the PDF, the cloud print server 50 converts the format of an image based on the print instruction information into the PDF.

The document output section 43 outputs the PDF document to the image forming unit 37 in order to print the PDF document obtained by the document obtaining section 42.

If the packet output section 44 determines, on the basis of a response to a query made by the query section 41, that print instruction information is stored in the cloud print server 50 and that the print instruction information indicates an instruction to print a document in the image forming apparatus 45 within the network 90, the packet output section 44 outputs a mode changing packet to the communication I/F 38 in order to send the mode changing packet to the image forming apparatus 45. In the first exemplary embodiment, the packet output section 44 is provided as an example of a sending unit that sends data for allowing an image forming apparatus to shift from the power-saving mode to the normal mode.

Figure 6:
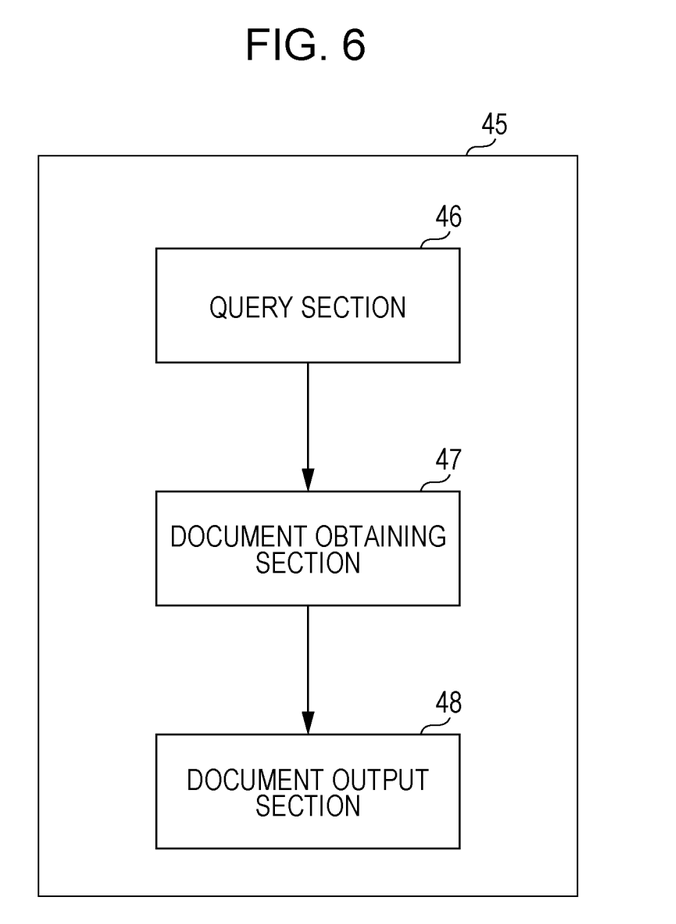
FIG. 6 is a block diagram illustrating an example of a second functional configuration of the image forming apparatus according to the first exemplary embodiment.

FIG. 6 is a block diagram illustrating an example of the functional configuration of the image forming apparatus 45.

The image forming apparatus 45 includes, as shown in FIG. 6, a query section 46, a document obtaining section 47, and a document output section 48.

The query section 46 queries, via the communication I/F 38, the cloud print server 50 regarding whether print instruction information is stored in the cloud print server 50. Upon receiving a response to this query via the communication I/F 38, the query section 46 determines, on the basis of the response, whether print instruction information indicating an instruction to print a document in the image forming apparatus 45 is stored in the cloud print server 50. In the first exemplary embodiment, the query section 46 is provided as an example of a checking unit that intermittently checks whether print instruction information is retained in a service.

The document obtaining section 47 obtains, via the communication I/F 38, a PDF document generated on the basis of print instruction information from the cloud print server 50. If the print instruction information indicates an instruction to print a document in a format other than the PDF, the cloud print server 50 converts the format of an image based on the print instruction information into the PDF.

The document output section 48 outputs the PDF document to the image forming unit 37 in order to print the PDF document obtained by the document obtaining section 47.

Operations performed by the image forming apparatuses 40 and 45 will now be described.

Figure 7:
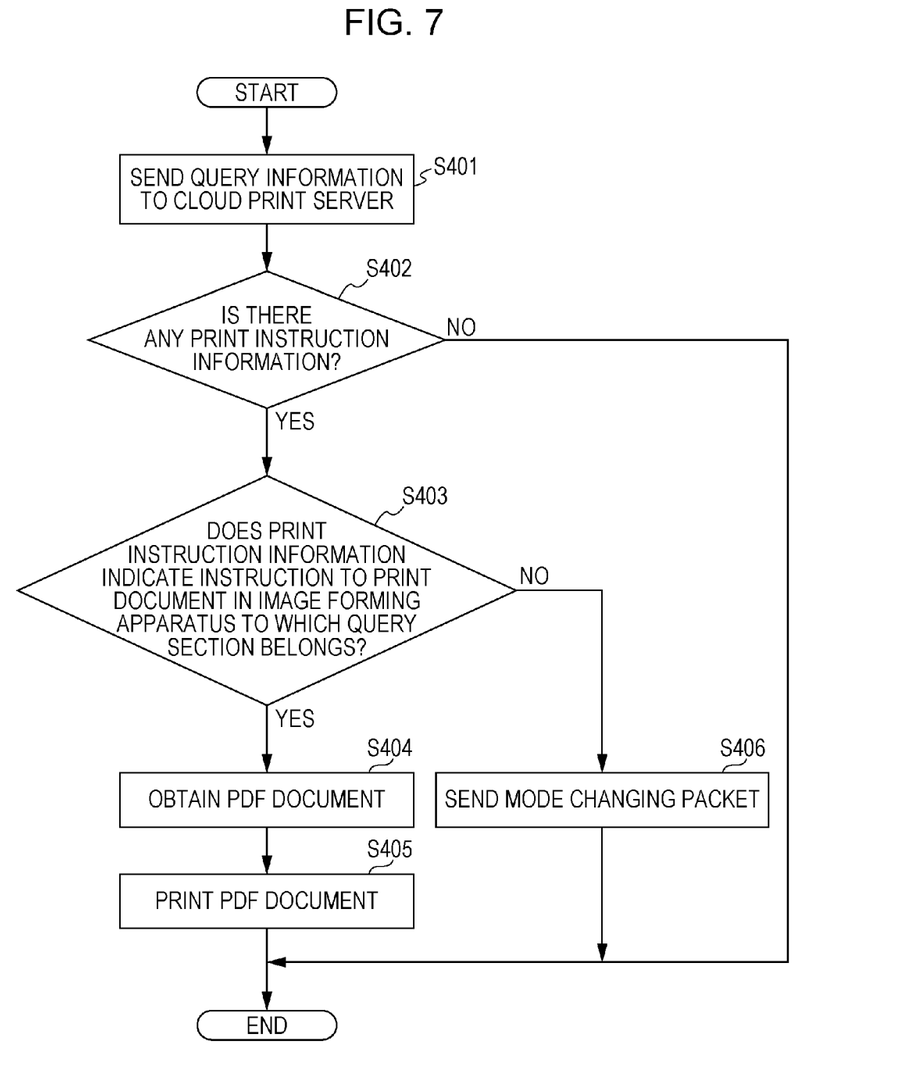
FIG. 7 is a flowchart illustrating an example of a first operation performed by the image forming apparatus according to an exemplary embodiment of the invention.

FIG. 7 is a flowchart illustrating an example of the operation performed by the image forming apparatus 40. It is assumed that, before this operation, the terminal apparatus 10 has requested the cloud print server 50 to generate print instruction information by specifying the image forming apparatus 45 to print a document. It is also assumed that the operation shown in FIG. 7 is performed at regular intervals.

In the image forming apparatus 40, in step S401, the query section 41 first sends the cloud print server 50, via the communication I/F 38, query information indicating a query asking whether print instruction information indicating an instruction to print a document in any one of the image forming apparatuses within the network 90 has been generated and stored in the cloud print server 50 in response to a request from the terminal apparatus 10. More specifically, the query section 41 retains in advance identifiers assigned to all the image forming apparatuses within the network 90, and sends the communication I/F 38 query information indicating a query asking whether print instruction information associated with one of the identifiers is stored in the cloud print server 50. The communication I/F 38 then sends the query information to the cloud print server 50.

Upon receiving a response to the query information from the cloud print server 50, in step S402, the query section 41 determines, on the basis of the received response, whether print instruction information indicating an instruction to print a document in any one of the image forming apparatuses within the network 90 is stored in the cloud print server 50. More specifically, the query section 41 determines, on the basis of the received response, whether print instruction information associated with one of the identifiers assigned to the image forming apparatuses within the network 90 is stored in the cloud print server 50.

If the result of step S402 is NO, the processing is discontinued. More specifically, if the query section 41 determines, on the basis of the received response, that print instruction information associated with any one of the identifiers assigned to the image forming apparatuses within the network 90 is not stored in the cloud print server 50, the processing is discontinued.

On the other hand, if the result of step S402 is YES, the process proceeds to step S403. In step S403, the query section 41 determines whether the print instruction information indicates an instruction to print a document in the image forming apparatus 40. More specifically, upon receiving a response indicating that print instruction information associated with an identifier assigned to one of the image forming apparatuses within the network 90 is stored in the cloud print server 50, the query section 41 determines in step S403 whether that identifier is an identifier assigned to the image forming apparatus 40.

If the result of step S403 is YES, the process proceeds to step S404. In step S404, the document obtaining section 42 obtains, via the communication I/F 38, a PDF document generated by the cloud print server 50 on the basis of the print instruction information. Then, in step S405, the document output section 43 outputs the PDF document to the image forming unit 37, and the image forming unit 37 prints the PDF document.

In contrast, if the result of step S403 is NO, the process proceeds to step S406. In step S406, the packet output section 44 sends, via the communication I/F 38, a mode changing packet to the image forming apparatus 45 to which an instruction to print a document represented by the print instruction information is given. A determination regarding whether the print instruction information indicates an instruction to print a document in the image forming apparatus 45 is made on the basis of the identifier associated with the print instruction information.

After sending the mode changing packet from the image forming apparatus 40 to the image forming apparatus 45 in this manner, the image forming apparatus 45 receives the mode changing packet and shifts from the power-saving mode to the normal mode. Then, the image forming apparatus 45 restarts querying the cloud print server 50.

Figure 8:
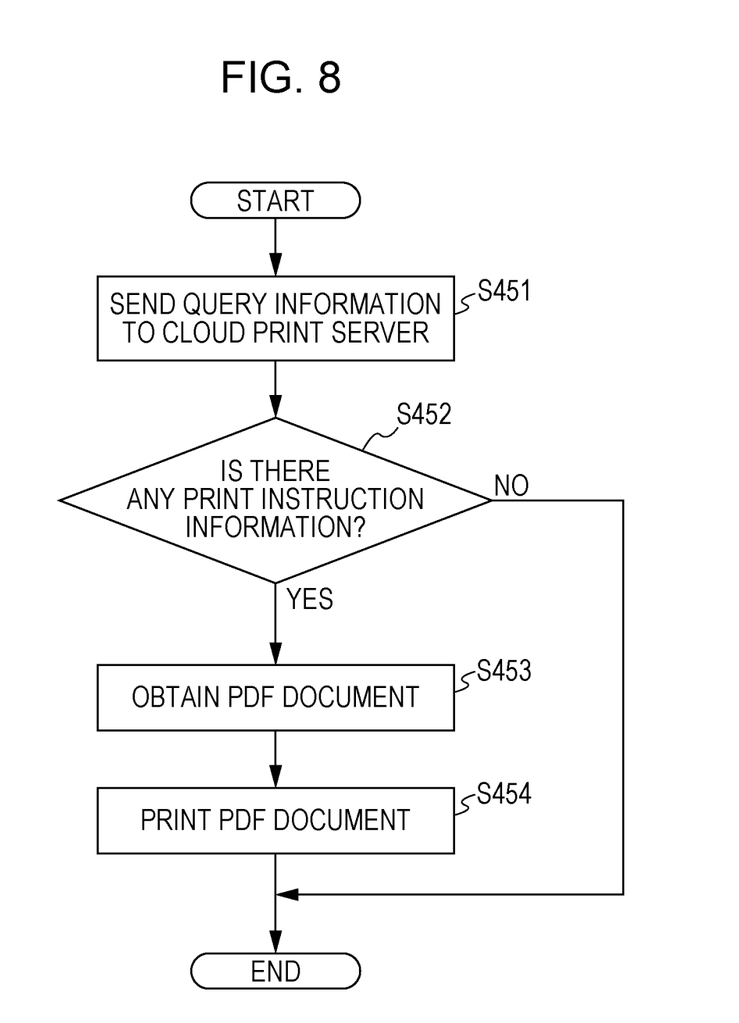
FIG. 8 is a flowchart illustrating an example of a second operation performed by the image forming apparatus according to an exemplary embodiment of the invention.

FIG. 8 is a flowchart illustrating an example of an operation performed by the image forming apparatus 45 which has shifted from the power-saving mode to the normal mode. It is also assumed that the operation shown in FIG. 8 is performed at predetermined regular intervals.

In step S451, in the image forming apparatus 45, the query section 46 first sends the cloud print server 50, via the communication I/F 38, query information indicating a query asking whether print instruction information indicating an instruction to print a document in the image forming apparatus 45 has been generated and stored in the cloud print server 50 in response to a request from the terminal apparatus 10. More specifically, the query section 46 retains in advance an identifier assigned to the image forming apparatus 45, and sends, the communication I/F 38, query information indicating a query asking whether print instruction information associated with that identifier is stored in the cloud print server 50. The communication I/F 38 then sends the query information to the cloud print server 50.

Upon receiving a response to the query information from the cloud print server 50, in step S452, the query section 46 determines, on the basis of the received response, whether print instruction information indicating an instruction to print a document in the image forming apparatus 45 is stored in the cloud print server 50. More specifically, the query section 46 determines, on the basis of the received response, whether print instruction information associated with the identifier assigned to the image forming apparatus 45 is stored in the cloud print server 50.

If the result of step S452 is NO, the processing is discontinued.

On the other hand, if the result of step S452 is YES, the process proceeds to step S453. In step S453, the document obtaining section 47 obtains, via the communication I/F 38, a PDF document generated by the cloud print server 50 on the basis of the print instruction information. Then, in step S454, the document output section 48 outputs the PDF document to the image forming unit 37, and the image forming unit 37 prints the PDF document.

In the first exemplary embodiment, the query section 41 of the image forming apparatus 40 determines whether print instruction information indicating an instruction to print a document in any one of the image forming apparatuses within the network 90 is stored in the cloud print server 50. However, the query section 41 does not always have to determine whether print instruction information for one of the image forming apparatuses within the network 90 is stored in the cloud print server 50, but may determine whether print instruction information for any one of image forming apparatuses managed by the image forming apparatus 40 is stored in the cloud print server 50.

In the first exemplary embodiment, if the query section 41 of the image forming apparatus 40 determines that print instruction information indicating an instruction to print a document in any one of the image forming apparatuses within the network 90 is stored in the cloud print server 50, and if such print instruction information does not indicate an instruction to print a document in the image forming apparatus 40, the packet output section 44 outputs a mode changing packet to the image forming apparatus 45 to which an instruction to print a document represented by the print instruction information is given. That is, if print instruction information indicating an instruction to print a document in any one of the image forming apparatuses within the network 90 is stored in the cloud print server 50, and if such print instruction information does not indicate an instruction to print a document in the image forming apparatus 40, the query section 41 assumes that it is highly likely that the image forming apparatus 45 has shifted to the power-saving mode, and outputs a mode changing packet to the image forming apparatus 45 without precisely determining whether the image forming apparatus 45 has actually shifted to the power-saving mode. However, the query section 41 of the image forming apparatus 40 may precisely determine whether the image forming apparatus 45 has shifted to the power-saving mode. Then, the image forming apparatus 40 may output a mode changing packet to the image forming apparatus 45 only when the query section 41 has precisely determined that the image forming apparatus 45 has shifted to the power-saving mode. The above-described determination whether the image forming apparatus 45 has shifted to the power-saving mode may be made as follows. The query section 41 of the image forming apparatus 40 queries plural times the cloud print server 50 regarding whether print instruction information indicating an instruction to print a document in any one of the image forming apparatuses within the network 90 is stored in the cloud print server 50. If the query section 41 detects a predetermined consecutive number of times or greater that print instruction information is stored in the cloud print server 50, it determines that the image forming apparatus 45 has shifted to the power-saving mode.

Moreover, in the first exemplary embodiment, if the query section 41 of the image forming apparatus 40 determines that print instruction information for the image forming apparatus 40 is stored in the cloud print server 50, the document output section 43 outputs a PDF document generated on the basis of the print instruction information to the image forming unit 37. If the query section 46 of the image forming apparatus 45 determines that print instruction information for the image forming apparatus 45 is stored in the cloud print server 50, the document output section 48 outputs a PDF document generated on the basis of the print instruction information to the image forming unit 37. Alternatively, the document output section 43 or 48 may output a PDF document, not to the image forming unit 37, but to a confidential box in which PDF documents are stored until a user inputs, for example, a user ID and a password. The confidential box may be a box which is newly created as follows. Upon requesting the cloud print server 50 to generate print instruction information, the terminal apparatus 10 sends a user ID and a password used for logging in the cloud print server 50 to the cloud print server 50. The cloud print server 50 then receives the user ID and the password and creates a confidential box in association with the user ID and the password. Alternatively, the confidential box may be created in advance in association with a user ID and a password used for logging in the cloud print server 50.

In the first exemplary embodiment, the following mechanism may be provided for allowing the image forming apparatus 40, which does not shift to the power-saving mode, to identify the status in which another image forming apparatus (e.g., the image forming apparatus 45) has shifted to the power-saving mode.

Before shifting to the power-saving mode, the image forming apparatus 45 informs the image forming apparatus 40 that the image forming apparatus 45 will shift to the power-saving mode. When the image forming apparatus 45 has shifted from the power-saving mode to the normal mode, it informs the image forming apparatus 40 that the image forming apparatus 45 has shifted from the power-saving mode to the normal mode. Upon receiving such information, the image forming apparatus 40 manages, in the form of a table, such information indicating that the image forming apparatus 45 has shifted to the power-saving mode (or the image forming apparatus 45 has shifted from the power-saving mode to the normal mode). Then, when accessing the cloud print server 50, if print instruction information indicating an instruction to print a document in the image forming apparatus 45 is stored in the cloud print server 50, the image forming apparatus 40 refers to the table and determines whether the image forming apparatus 45 has shifted to the power-saving mode.

In the first exemplary embodiment, it is determined whether the image forming apparatus 45 has shifted to the power-saving mode in the state in which the image forming apparatus 45 does not, at least regularly, access the cloud print server 50. If it can be determined whether the image forming apparatus 45 has shifted to a state in which the image forming apparatus 45 does not regularly access the cloud print server 50, it is not always necessary to determine whether the image forming apparatus 45 has shifted to the power-saving mode. In this case, the state in which the image forming apparatus 45 does not regularly access the cloud print server 50 is an example of a state in which the image forming apparatus 45 is not in a checking state in which it is intermittently checked whether print instruction information is stored in a service. The query section 41 that precisely determines that the image forming apparatus 45 has shifted to the power-saving mode is an example of a determination unit that determines that a printing device is not in the above-described checking state.

In the first exemplary embodiment, the image forming apparatus 45 is allowed to shift from the power-saving mode in which the image forming apparatus 45 does not, at least regularly, access the cloud print server 50 to the normal mode. If the image forming apparatus 45 is allowed to shift to a state in which the image forming apparatus 45 regularly accesses the cloud print server 50, it does not always have to shift from the power-saving mode to the normal mode. In this case, the packet output section 44 of the image forming apparatus 40 is an example of a processor that performs processing for allowing the image forming apparatus 45 to shift to the checking state.

Second Exemplary Embodiment

An operation of a second exemplary embodiment will be briefly described below. In the second exemplary embodiment, as well as in the first exemplary embodiment, the term "power-saving mode" refers to a state in which access is not made, at least regularly, to the cloud print server 50.

Figure 9:
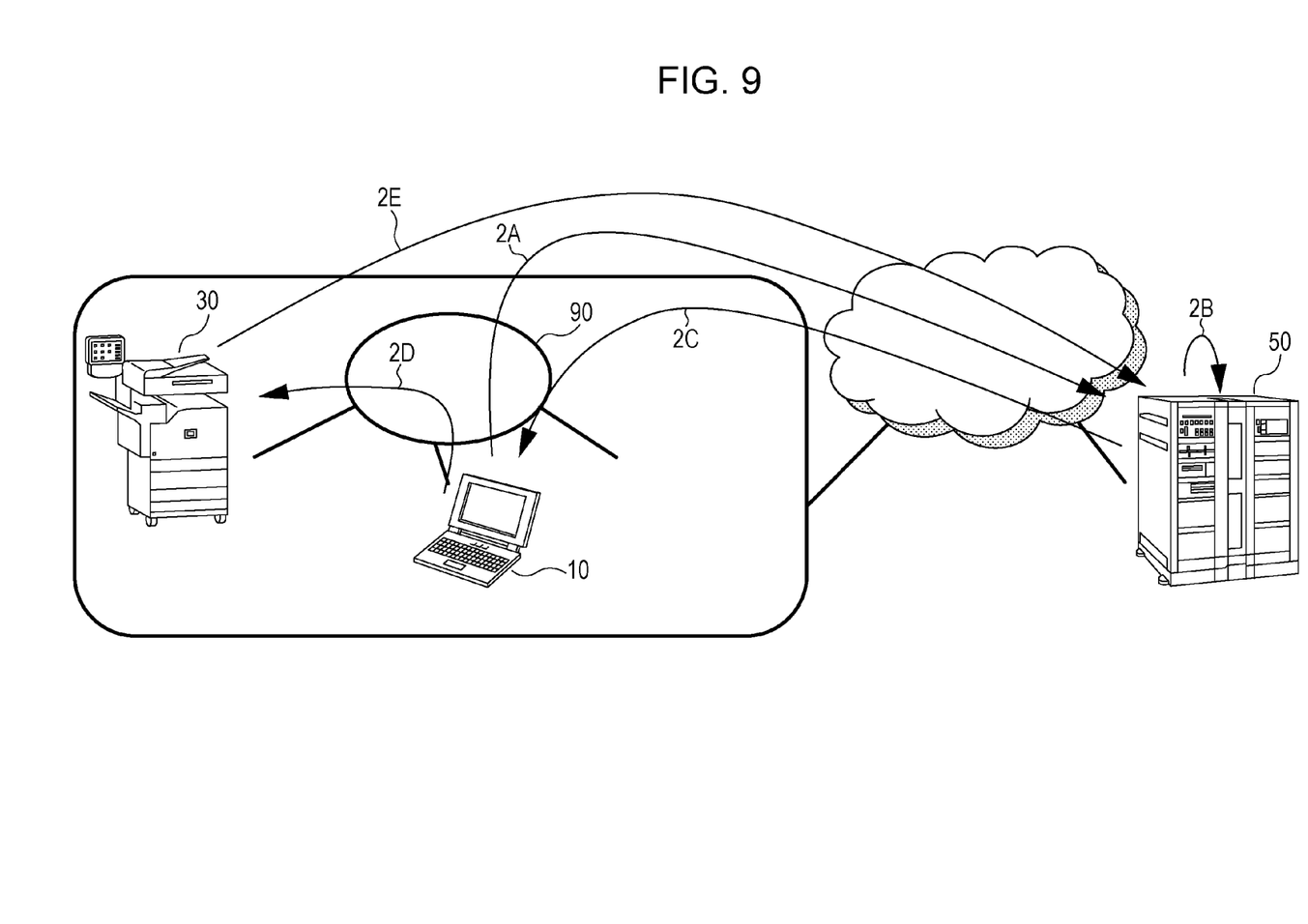
FIG. 9 schematically illustrates an operation according to a second exemplary embodiment of the invention.

FIG. 9 schematically illustrates an operation of the second exemplary embodiment. In the second exemplary embodiment, one of the image forming apparatuses 30a, 30b, and 30c connected to the network 90 is an example of a printing device, which is set as the image forming apparatus 30.

In response to an operation performed by a user, the terminal apparatus 10 requests the cloud print server 50 to print a document by using the image forming apparatus 30 (indicated by the arrow 2A in FIG. 9).

Then, the cloud print server 50 generates print instruction information for the image forming apparatus 30, and waits for polling from the image forming apparatus 30. The cloud print server 50 also determines whether the image forming apparatus 30 has shifted to the power-saving mode (indicated by the arrow 2B in FIG. 9).

Then, upon determining that the image forming apparatus 30 has shifted to the power-saving mode, the cloud print server 50, which is an example of an information processing apparatus, returns a HyperText Transfer Protocol (HTTP) response to the terminal apparatus 10 as a response to the print request. The HTTP response includes a Uniform Resource Locator (URL) of a management page and indicates that the image forming apparatus 30 has shifted to the power-saving mode and that the user may access the URL of the management page in order to allow the image forming apparatus 30 to shift from the power-saving mode to the normal mode (indicated by the arrow 2C in FIG. 9).

Upon receiving the HTTP response, the terminal apparatus 10 displays a page including the URL of the management page by using a browser. When the user clicks the URL, the terminal apparatus 10 sends a GET request for the management page to the image forming apparatus 30 and allows the image forming apparatus 30 to shift from the power-saving mode to the normal mode (indicated by the arrow 2D in FIG. 9).

The image forming apparatus 30 responds to the GET request for the management page and shifts from the power-saving mode to the normal mode. The image forming apparatus 30 then performs polling for the cloud print server 50, and obtains and prints the document generated on the basis of the print instruction information (indicated by the arrow 2E in FIG. 9).

Details of the configuration and the operation of the second exemplary embodiment will be given.

The major component of the cloud print system of the second exemplary embodiment is the cloud print server 50. Accordingly, the configuration of the cloud print server 50 will be discussed first.

Figure 10:
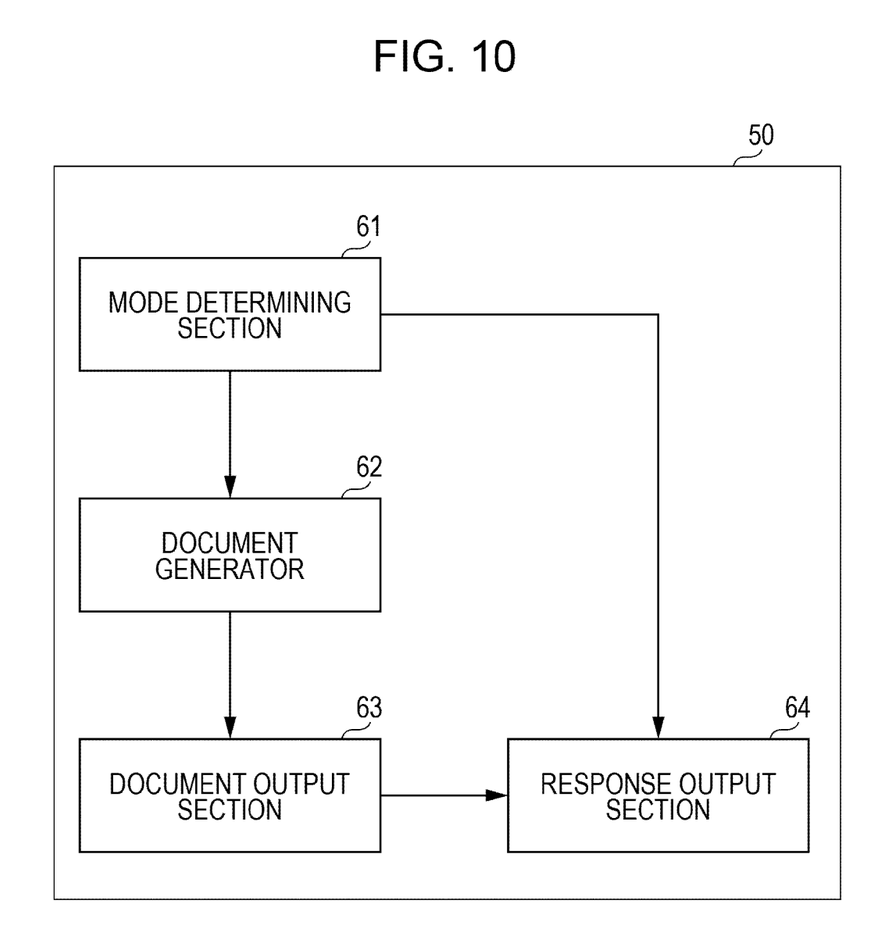
FIG. 10 is a block diagram illustrating an example of the functional configuration of a cloud print server according to the second exemplary embodiment.

FIG. 10 is a block diagram illustrating an example of the functional configuration of the cloud print server 50.

The cloud print server 50 includes, as shown in FIG. 10, a mode determining section 61, a document generator 62, a document output section 63, and a response output section 64.

The mode determining section 61 monitors regular polling performed from the image forming apparatus 30 and thereby determines whether the image forming apparatus 30 has shifted to the power-saving mode. In the second exemplary embodiment, the mode determining section 61 is provided as an example of a determining unit that determines whether a printing device is in the power-saving mode.

Upon receiving polling from the image forming apparatus 30, the document generator 62 generates a PDF document on the basis of print instruction information indicating an instruction to print a document in the image forming apparatus 30. If the print instruction information indicates an instruction to print a document in a format other than the PDF, the cloud print server 50 converts the format of an image based on the print instruction information into the PDF.

The document output section 63 outputs the PDF document to the communication I/F 54 in order to send the PDF document to the image forming apparatus 30.

Upon sending the PDF document to the image forming apparatus 30, the response output section 64 outputs a response indicating the completion of printing to the communication I/F 54 in order to send the response to the terminal apparatus 10. If the mode determining section 61 has determined that the image forming apparatus 30 is in the power-saving mode, the response output section 64 outputs a response that allows the image forming apparatus 30 to shift from the power-saving mode to the normal mode to the communication I/F 54 in order to send the response to the terminal apparatus 10. In the second exemplary embodiment, the response output section 64 is provided as an example of a notification unit that supplies information concerning a URL that allows the image forming apparatus 30 to shift from the power-saving mode to the normal mode.

The operation performed by the cloud print server 50 is as follows.

Figure 11:
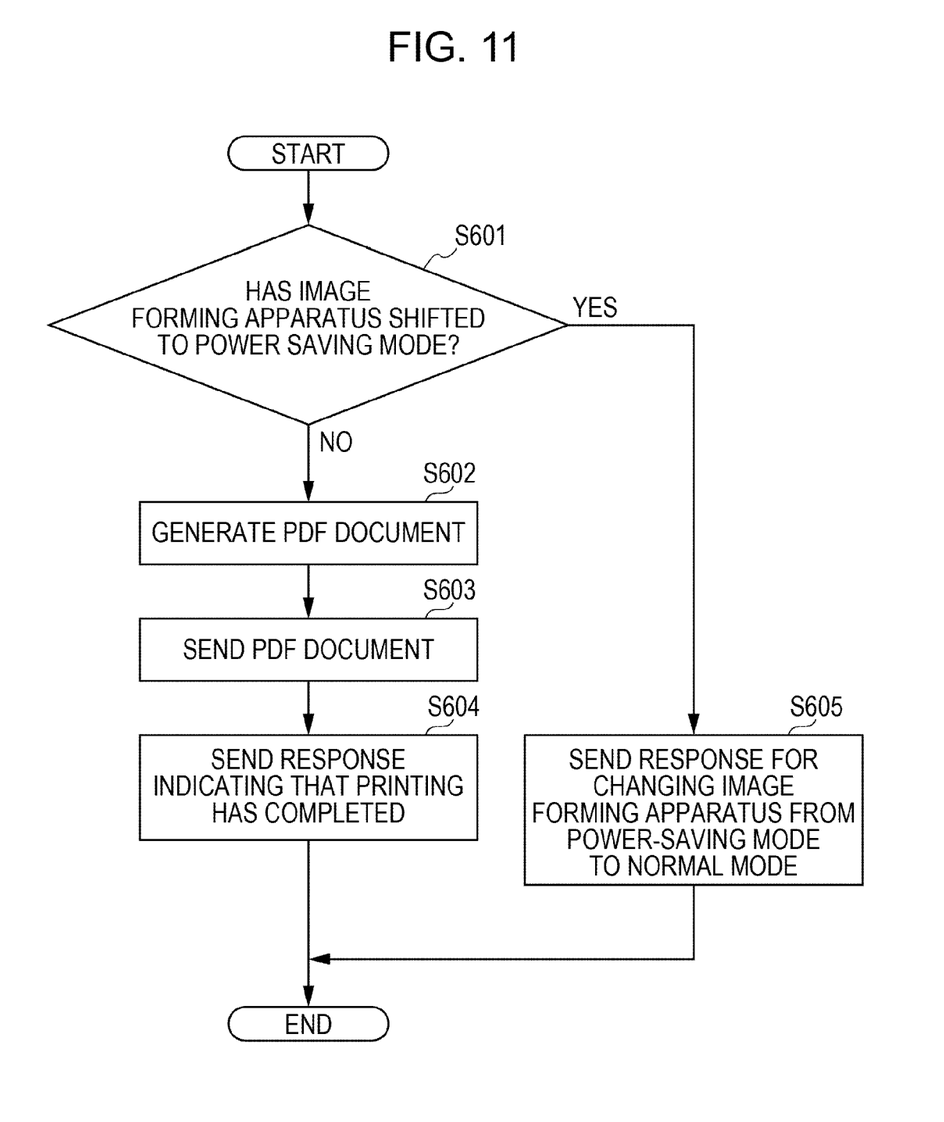
FIG. 11 is a flowchart illustrating an example of an operation performed by the cloud print server according to the second embodiment of the invention.

FIG. 11 is a flowchart illustrating an example of the operation performed by the cloud print server 50. It is assumed that, before performing this operation, the terminal apparatus 10 has requested the cloud print server 50 to generate print instruction information by specifying the image forming apparatus 30 to print a document. It is also assumed that the operation shown in FIG. 11 is performed at predetermined regular intervals.

In step S601, in the cloud print server 50, the mode determining section 61 first determines whether the image forming apparatus 30 specified by the terminal apparatus 10 has shifted to the power-saving mode. This determination may be made by checking whether polling has been sent from the image forming apparatus 30. More specifically, the mode determining section 61 determines whether the cloud print server 50 has received, after the previous determination was made, query information indicating a query asking whether print instruction information associated with the identifier of the image forming apparatus 30 specified by the terminal apparatus 10 is stored in the cloud print server 50. Alternatively, this determination may be made by receiving, from the image forming apparatus 30, a power-saving mode transition message indicating that the image forming apparatus 30 has shifted to the power-saving mode and a power-saving mode end message indicating that the image forming apparatus 30 has shifted from the power-saving mode to the normal mode.

If it is determined in step S601 that the image forming apparatus 30 has not shifted to the power-saving mode, the process proceeds to step S602. In step S602, the document generator 62 generates a PDF document on the basis of the print instruction information. In step S603, in accordance with polling from the image forming apparatus 30, the document output section 63 outputs the PDF document to the communication I/F 54. The communication I/F 54 then sends the PDF document to the image forming apparatus 30. Thereafter, in step S604, the response output section 64 outputs a response indicating the completion of printing to the communication I/F 54, and the communication I/F 54 sends the response to the terminal apparatus 10.

If it is determined in step S601 that the image forming apparatus 30 has shifted to the power-saving mode, the process proceeds to step S605. In step S605, the response output section 64 outputs a response that allows the image forming apparatus 30 to shift from the power-saving mode to the normal mode to the communication I/F 54, and the communication I/F 54 sends the response to the terminal apparatus 10. As the response that allows the image forming apparatus 30 to shift from the power-saving mode to the normal mode, a HTTP response may be used, as stated above. More specifically, the HTTP response includes a URL of a management page and indicates that the image forming apparatus 30 is in the power-saving mode and that the user may access the URL of the management page in order to allow the image forming apparatus 30 to shift from the power-saving mode to the normal mode.

In the second exemplary embodiment, it is determined whether the image forming apparatus 30 has shifted to the power-saving mode in the state in which the image forming apparatus 30 does not, at least regularly, access the cloud print server 50. If it can be determined whether the image forming apparatus 30 has shifted to a state in which the image forming apparatus 30 does not regularly access the cloud print server 50, it is not always necessary to determine whether the image forming apparatus 30 has shifted to the power-saving mode. In this case, the state in which the image forming apparatus 30 does not regularly access the cloud print server 50 is an example of a state in which the image forming apparatus 30 is not in a checking state in which it is intermittently checked whether print instruction information is stored in a service. The mode determining section 61 is an example of a determination unit that determines that a printing device is not in the above-described checking state.

In the second exemplary embodiment, the image forming apparatus 30 is allowed to shift from the power-saving mode in which the image forming apparatus 30 does not, at least regularly, access the cloud print server 50 to the normal mode. If the image forming apparatus 30 is allowed to shift to a state in which the image forming apparatus 30 regularly accesses the cloud print server 50, it does not always have to shift from the power-saving mode to the normal mode. In this case, the response output section 64 is an example of a processor that performs processing for allowing the image forming apparatus 30 to shift to the checking state.

A program implementing the exemplary embodiments may be provided via a communication medium, or may be provided through the use of a recording medium, such as a compact disk-read only memory (CD-ROM), storing the program therein.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a management unit that manages a plurality of printing devices;
   a checking unit that intermittently checks whether print instruction information for any of the printing devices managed by the information processing apparatus is stored in a storage unit;
   a determining unit that determines whether the print instruction information indicating an instruction to print a document is for the information processing apparatus and determines whether the print instruction information is for one of the plurality of printing devices managed by the information processing apparatus if the print instruction information is stored in the storage unit; and
   a processor that performs processing for allowing a specific printing device to shift to a checking state in which the specific printing device intermittently checks whether print instruction information is stored in the storage unit if the determining unit has determined that the print instruction information indicating an instruction to print a document is for the specific printing device.

2. The information processing apparatus according to claim 1, wherein, as the processing for allowing the specific printing device to shift to the checking state, the processor sends data to the specific printing device.

3. The information processing apparatus according to claim 1, further comprising:
   a printer that prints the document if the checking unit has checked that print instruction information indicating an instruction to print a document in the information processing apparatus is stored in the storage unit,
   wherein, if the checking unit has checked that print instruction information indicating an instruction to print a document in the specific printing device is retained in the storage unit, the determining unit determines that the specific printing device is not in the checking state.

4. The information processing apparatus according to claim 2, further comprising:
   a printer that prints the document if the checking unit has checked that print instruction information indicating an instruction to print a document in the information processing apparatus is stored in the storage unit,
   wherein, if the checking unit has checked that print instruction information indicating an instruction to print a document in the specific printing device is retained in the storage unit, the determining unit determines that the specific printing device is not in the checking state.

5. The information processing apparatus according to claim 1, wherein, as the processing for allowing the specific printing device to shift to the checking state, the processor supplies information used for sending data to the specific printing device to a requesting device that has requested the service to generate print instruction information indicating an instruction to print a document in the specific printing device.

6. The information processing apparatus according to claim 1, wherein, upon detecting a predetermined consecutive number of times or greater that print instruction information indicating an instruction to print a document in the specific printing device has been stored in the storage unit, the determining unit determines that the specific printing device is not in the checking state.

7. The information processing apparatus according to claim 2, wherein, upon detecting a predetermined consecutive number of times or greater that print instruction information indicating an instruction to print a document in the specific printing device has been stored in the storage unit, the determining unit determines that the specific printing device is not in the checking state.

8. The information processing apparatus according to claim 3, wherein, upon detecting a predetermined consecutive number of times or greater that print instruction information indicating an instruction to print a document in the specific printing device has been stored in the storage unit, the determining unit determines that the specific printing device is not in the checking state.

9. The information processing apparatus according to claim 4, wherein, upon detecting a predetermined consecutive number of times or greater that print instruction information indicating an instruction to print a document in the specific printing device has been stored in the storage unit, the determining unit determines that the specific printing device is not in the checking state.

10. The information processing apparatus according to claim 5, wherein, upon detecting a predetermined consecutive number of times or greater that print instruction information indicating an instruction to print a document in the specific printing device has been stored in the service, the determining unit determines that the specific printing device is not in the checking state.

11. An information processing method comprising:
    managing a plurality of printing devices by an information processing apparatus;

intermittently checking whether print instruction information for any of the printing devices managed by the information processing apparatus is stored in a storage unit;

determining, by the information processing apparatus, whether the print instruction information indicating an instruction to print a document is for the information processing apparatus and determining, by the information processing apparatus, whether the print instruction information is for one of the plurality of printing devices managed by the information processing apparatus if the print instruction information is stored in the storage unit; and the information processing apparatus performing processing for allowing a specific printing device to shift to a checking state in which the specific printing device intermittently checks whether print instruction information is stored in the storage unit if the determining determines that the print instruction information indicating an instruction to print a document is for the specific printing device.

12. A non-transitory computer readable medium storing a program causing a computer to execute a process, the process comprising:

managing a plurality of printing devices by an information processing apparatus;

intermittently checking whether print instruction information for any of the printing devices managed by the information processing apparatus is stored in a storage unit;

determining, by the information processing apparatus, whether the print instruction information indicating an instruction to print a document is for the information processing apparatus and determining, by the information processing apparatus, whether the print instruction information is for one of the plurality of printing devices managed by the information processing apparatus if the print instruction information is stored in the storage unit; and the information processing apparatus performing processing for allowing a specific printing device to shift to a checking state in which the specific printing device intermittently checks whether print instruction information is stored in the storage unit if the determining determines that the print instruction information indicating an instruction to print a document is for the specific printing device.

13. An information processing apparatus comprising:

a management unit that manages a plurality of printing devices;

a checking unit that intermittently checks whether print instruction information for any of the printing devices managed by the information processing apparatus is stored in a storage unit;

a determining unit that determines whether the print instruction information indicating an instruction to print a document is for the information processing apparatus or one of the plurality of printing devices managed by the information processing apparatus if the print instruction information is stored in the storage unit;

a processor that performs processing for allowing a specific printing device to shift to a checking state in which the specific printing device intermittently checks whether print instruction information is stored in the storage unit if the determining unit has determined that the print instruction information indicating an instruction to print a document is for the specific printing device;

a receiving unit that receives a notice that the printing device will shift to a power-saving state in which the printing device intermittently does not check whether print instruction information is stored in the storage unit; and a storing unit that stores a table which notes a status of the printing device, the status indicates whether the printing device is in checking state or in power-saving state, wherein the processor performs processing for allowing the specific printing device to shift to the checking state if the status of the specific printing device is power-saving mode according to the table stored in the storing unit.

* * * * *